(12) United States Patent
Wicker et al.

(10) Patent No.: US 8,282,015 B2
(45) Date of Patent: Oct. 9, 2012

(54) DOCUMENT WITH LINKED VIEWER FILE FOR CORRELATED PRINTING

(75) Inventors: David Michael Wicker, Dansville, NY (US); Michael Scott Caton, Oakfield, NY (US)

(73) Assignee: Document Security Systems, Inc., Rochester, NY (US)

( * ) Notice: Subject to any disclaimer, the term of this patent is extended or adjusted under 35 U.S.C. 154(b) by 967 days.

(21) Appl. No.: 11/741,394

(22) Filed: Apr. 27, 2007

(65) Prior Publication Data

US 2007/0267865 A1 Nov. 22, 2007

Related U.S. Application Data

(63) Continuation-in-part of application No. 11/495,900, filed on Jul. 31, 2006.

(60) Provisional application No. 60/703,860, filed on Aug. 1, 2005, provisional application No. 60/794,826, filed on Apr. 26, 2006.

(51) Int. Cl.
   *G06K 19/06* (2006.01)
(52) U.S. Cl. ............ 235/494; 235/487; 283/17; 283/72; 283/73; 283/93; 283/113; 358/1.9; 358/3.28; 380/51; 380/54; 380/243
(58) Field of Classification Search .............. 235/494
   See application file for complete search history.

(56) References Cited

U.S. PATENT DOCUMENTS

| | | | |
|---|---|---|---|
| 5,149,140 A | 9/1992 | Mowry et al. | |
| 5,171,040 A | 12/1992 | Orndorff | |
| 5,297,815 A | 3/1994 | Anderson | |
| 5,396,559 A * | 3/1995 | McGrew | 380/54 |
| 5,708,717 A | 1/1998 | Alasia | |
| 5,788,285 A | 8/1998 | Wicker | |
| 5,995,638 A * | 11/1999 | Amidror et al. | 382/100 |
| 6,000,728 A | 12/1999 | Mowry | |
| 6,104,812 A | 8/2000 | Koltai et al. | |
| 6,209,922 B1 | 4/2001 | Klein | |
| 6,305,718 B1 | 10/2001 | Kendrick | |
| 6,692,030 B1 | 2/2004 | Phillips | |
| 6,768,558 B1 * | 7/2004 | Yamashita et al. | 358/1.18 |
| 6,865,001 B2 | 3/2005 | Long et al. | |
| 6,966,998 B1 | 11/2005 | Spowart | |
| 2003/0030271 A1 | 2/2003 | Wicker | |

(Continued)

FOREIGN PATENT DOCUMENTS

CA        2207127        12/1997

(Continued)

OTHER PUBLICATIONS

Communication Pursuant to Article 94(3) EPC issued in corresponding European Patent Application No. 06 800 589.1 dated Mar. 25, 2010 (4 pages).

(Continued)

*Primary Examiner* — Thien M. Le
*Assistant Examiner* — Christopher Stanford
(74) *Attorney, Agent, or Firm* — Nixon Peabody LLP (57) ABSTRACT

A document and a related viewer for the document are constructed as image files capable of transmission to a printing site. The document file contains information for printing a document having hidden security indicia, and the viewer file contains information for printing a document viewer having a decrypting portion for revealing the hidden security indicia in the document.

20 Claims, 4 Drawing Sheets

U.S. PATENT DOCUMENTS

| | | |
|---|---|---|
| 2003/0173406 A1* | 9/2003 | Bi et al. .................. 235/491 |
| 2005/0188205 A1 | 8/2005 | Alasia et al. |
| 2005/0225080 A1 | 10/2005 | Wicker |
| 2007/0029394 A1 | 2/2007 | Wicker |
| 2007/0098961 A1 | 5/2007 | McCarthy et al. |
| 2007/0106476 A1 | 5/2007 | Bratchley et al. |

FOREIGN PATENT DOCUMENTS

| | | |
|---|---|---|
| GB | 2217258 | 10/1989 |
| WO | WO 90/08046 | 7/1990 |
| WO | 9720298 A1 | 6/1997 |
| WO | WO 03/013870 A3 | 2/2003 |
| WO | WO 93/22145 | 11/2003 |
| WO | WO 2004/033229 A2 | 4/2004 |
| WO | WO 2004/068421 A2 | 8/2004 |
| WO | WO 2004/110773 A1 | 12/2004 |
| WO | WO 2005/070693 A1 | 8/2005 |
| WO | WO 2006/001793 A1 | 1/2006 |
| WO | WO 2006/029033 A2 | 3/2006 |
| WO | WO 2007/016536 A2 | 8/2006 |

OTHER PUBLICATIONS

Canadian Office Action (dated May 11, 2011) in corresponding Canadian Patent Application No. 2,668,658 (3 pages).

* cited by examiner

DOCUMENT WITH LINKED VIEWER FILE FOR CORRELATED PRINTING

CROSS-REFERENCE TO RELATED APPLICATIONS

This application is a continuation-in part of U.S. patent application Ser. No. 11/495,900, filed Jul. 31, 2006, which claims priority from U.S. Provisional Patent Application No. 60/703,860, filed Aug. 1, 2005, and U.S. Provisional Patent Application No. 60/794,826, filed Apr. 26, 2006. All of these prior applications are hereby incorporated by reference.

TECHNICAL FIELD

The present invention relates generally to document protection methods and products and, more particularly, to printing or otherwise forming documents with embedded security images and dedicated viewers for revealing the embedded images.

BACKGROUND OF THE INVENTION

Secure documents have been produced in the past by letterpress, offset, and intaglio printing processes, including such processes adapted for embedding hidden information or security images. Document embedded security features deter counterfeiting of valuable papers, important records, and financial instruments such as checks, currency, so that original documents can be verified and unauthorized copies of these documents can be readily distinguished from the originals.

The printing of such original documents can be carried out either in black-and-white (B&W) or in color; and if in color, in spot color, colored backgrounds, or multicolor printing. Multiple colors are often preferred for original documents to enhance aesthetic value and ease of recognition, as well as to protect the documents from copying by conventional means. Printing processes for printing valuable originals, whether in B&W or in color, include intaglio (e.g., gravure), letterpress, and offset printing, among others. These and the other processes mentioned in this application are very well known in the art and will not be discussed in great detail.

One approach to deterring counterfeiting or other forms of unauthorized reproduction of originals includes embedding "latent images" containing covert information or other indicia (e.g., security codes, graphics, or information such as amounts of money and bank account numbers) within the original documents. The latent images, which are hidden within a visually integrated setting, are intended to be practically invisible to the naked eye under normal viewing conditions. Such settings for hiding the latent images range from simple background tints to the remainders of composite images within which the latent images are hidden. However, the latent images are otherwise distinguishable through the use of a visual aid, such as a magnifier or reader. Upon reproduction, such as by scanning or copying of the originals, the latent images can be arranged to either disappear or become more pronounced. That is, either the absence of the latent image or the visible presence of the latent image in a copy can be construed as an indication of a non-original document.

The latent images can be produced by embedding one line-screen pattern within another line-screen pattern. Each of the line-screen patterns can be formed by an array of print elements, such as dots, dashes, line segments, or other elemental shapes, in an arrangement of systematically spaced lines. The two line-screen patterns can be formed so as to be indistinguishable from one another to the naked eye, but can differ in some respect that can be optically exploited for viewing the latent image. For example, the two line-screen patterns can be printed in the same color and at the same print density but can differ in orientation or line frequency.

A first line-screen pattern can be printed in defined areas having one or more shapes for forming the latent image. A second line-screen pattern can be printed throughout an adjoining or an enlarged area forming a visually integrated setting, such as a complementary background or a remaining portion of a composite image. Each of the two line patterns can be formed by a plurality of line patterns in different colors so long as the multiple line patterns that form the latent image match the color and overall appearance of the one or more line patterns that form the visually integrated setting.

Other developments for purposes of providing document protection are disclosed in the patent literature, as for example, in U.S. Pat. No. 5,018,767 issued May 28, 1991; U.S. Pat. No. 5,193,853 issued Mar. 16, 1993; and U.S. Pat. No. 3,675,948 issued Jul. 11, 1972; and U.S. Pat. No. 4,143,967 issued Mar. 13, 1979, all to Ralph C. Wicker. All of these patents, which are hereby incorporated by reference, disclose various means for providing methods and products to enable copies of documents to be distinguished from the originals, as for example, by a "large dot-small dot pattern", a "close line-spaced pattern", and images or indicia which are screen printed at minutely varied spaces and/or angles on the originals and are intended to produce a highly visible moire pattern effect on the unauthorized copies. In this specification, the words "print", "printed" and "printing" are used to refer to the making of an original document by any of a number of known printing means, including transferring images from one source to another, typically a paper medium, using a transfer agent such as ink or toner. The words "copy" and "copying" to refer to making copies from an original printed document.

Special viewing devices, referred to as "authentication viewers" or "document viewers", can be used to distinguish latent security images from the visually integrated setting in which the images are embedded. Such viewers can incorporate tints or matching patterns that differentially affect the appearance of the line screen patterns that make up the security images and their integrated settings. For example, the viewers can incorporate patterns that complement one or the other line screen patterns, creating the necessary contrast to render the security images visible.

Different line screen patterns require authentication viewers with different matching patterns. Thus, the use of a range of line-screen patterns for hiding security images requires the use of multiple viewers, which must be matched to the original printed documents. This can add additional cost and complexity and tends to limit the number of different screen patterns available for use. Missing viewers or attempts to authenticate documents in different locations can delay or otherwise frustrate the authentication of the documents.

SUMMARY OF THE INVENTION

The invention, among its various embodiments, uniquely matches original documents and authentication viewers and provides for their ready transmission. Both the original documents and their viewers can be constructed as print files that can be sent over internet, intranet, extranet, or other transmission link and printed together so that both the original documents and their authentication viewers are available for use together where desired. Latent security images within the documents can be uniquely encoded by patterns of print elements, usually in the form of line-screen patterns, which can be reproduced in corresponding forms in both the original documents and their viewers.

The original documents are designed with latent images embedded within visually integrated settings. The latent images can be in the form of text or graphics. The visually integrated setting is preferably a tinted background but can also take the form of other text or graphics within which the latent images are incorporated. Both the latent images and their visually integrated settings can be composed of print elements, which are ordered into patterns, such as line-screen patterns. The print element patterns of the latent images and their visually integrated settings match or otherwise blend with each other so that the respective patterns are substantially indistinguishable under normal viewing conditions. However, some difference remains between the respective patterns or their relative orientations, which can be exploited by authentication viewers to provide contrast between the latent images and their visually integrated settings.

Both the original documents and their authentication viewers can be constructed and stored as print files. Preferably, both (a) the print element patterns for forming the latent images and their visually integrated settings in the original documents and (b) the print element patterns for forming decrypting portions of the authentication viewers are arranged for printing as bit maps or raster images. The print files can contain the desired raster images or can include predefined fonts or other structures that are themselves defined in advance as the desired bit map structures.

The print files for the original documents and their authentication viewers can be transmitted separately or together via the internet or other network connection to one or more print sites, where the original documents and their authentication viewers can be printed. The transmissions can take place over various networks or other transmission links, between local or remote sites, such as over internet, intranet, extranet, wireless XML facsimile, or computer-to-printer connections. Preferably, both the original documents and their authentication viewers are printed from the same printer or from printers exhibiting similar printing profiles. Both can be printed on print mediums of choice, but the original document is preferably printed on paper and the authentication viewer is preferably printed on a transparency, film, or other transmissive medium.

For authenticating the printed original document, the printed authentication viewer can be laid over the printed original document in a position that aligns the corresponding patterns in the original document and the viewer. The viewer pattern complements one of the respective patterns in the original document for increasing contrast between the latent image and its integrated setting so that the latent image is visible through the viewer.

The complementary pattern of the authentication viewer can be printed directly on a transparency or other transmissive medium for immediate use verifying its associated original document or can be printed on the same or different medium as a master for producing an authentication viewer in another form. For example, the printed copy of the viewer can be used as a master for producing an embossed or laser-engraved viewer in plastic or glass. The plastic or glass viewer medium can also be shaped as a lens to magnify the latent images. The complementary pattern of the viewer could also be printed on paper, scanned, cleaned within an image-processing program, and reprinted on a transparency for use as an authentication viewer.

The patterns for embedding latent images with visually integrated settings can be varied between different areas of the original documents and the complementary patterns in the associated viewers can be similarly varied. Reference marks can be provided on both the printed original document and the printed viewer to facilitate alignment between the overlapping patterns to reveal the differently encoded latent images. Multiple encoding patterns for embedding latent images in the original documents can also be associated with different authentication viewers. That is, a single original document file can be associated with two or more viewer files. One authentication viewer can be arranged to reveal some of the latent images in the original document, and another authentication viewer can be arranged to reveal other of the latent images within the same original document. A compound viewer could be arranged with different viewing sections, i.e., decrypting portions, to reveal both patterns of latent images. Different levels of access to information embedded in the latent images can be controlled in this way, such as between a bank teller and a teller supervisor.

An order containing information for printing the original document can be received by a server that accesses a layout program for formatting the original document and authentication viewer. Some of the information for printing the original document is arranged for printing within data fields of the document layout, and the same or other information is encoded as latent images within a visually integrated setting. Both the latent images and their integrated settings are preferably encoded as line-screen patterns represented by raster images or predefined vector graphics within with the line-screen patterns are already defined. Complementary raster images or predefined vector graphics are also used to define one or more decrypting portions of a complementary authentication viewer. Files containing information for printing both the original document and a related authentication viewer are output from the server over a network to one or more printing sites. Ultimately, the individual print files for the original document and authentication viewer are received by single printer or by a pair of printers so related as to produce sufficiently corresponding copies of the intended raster images to match the line-screen patterns between the original document and its viewer.

Instead of embedding the latent images entirely within the original document, some portion of the latent images could also be encoded within the viewer. For example, the both the original document and the viewer could be arranged with latent images embedded within visually integrated settings. In addition, the line-screen pattern forming the setting of the viewer could be made complementary to the line-screen pattern forming the latent image in the original document, and the line-screen pattern forming the setting of the original document could be made complementary to the line-screen pattern forming the latent image in the viewer. When aligned for viewing, the latent images in both the original document and the viewer are visible together, each respectively distinguished from their respective settings.

One version of the invention as a document authentication system includes a document file linked with a viewer file for communication over a network to one or more printing sites. The document file contains information for printing a document having hidden security indicia. The viewer file contains information for printing a document viewer having a decrypting portion for revealing the hidden security indicia in the document.

Preferably, the security indicia are embedded as a latent image within a visually integrated setting of the printed document so as to be at least partially indistinguishable from the integrated setting to the naked eye. The latent image and its visually integrated setting are preferably formed by relatively oriented print elements arranged in respective configurations. The decrypting portion of the viewer can be formed by relatively oriented print elements arranged in a configuration that at least partially matches one of the different configurations of (a) the print elements of the latent image and (b) the print elements of its visually integrated setting.

The document file and the viewer file can be arranged with respect to one or more printers having matching reproductive error profiles so that the matching configurations of print elements are reproduced with corresponding errors in the printed document and the printed viewer. The use of a single printer or matching printers allows the original document and the document viewer to be reproduced by conventional digital printers, such as laser printers with sufficiently matching accuracy. The document file and the viewer file can represent the matching configurations of print elements as bitmaps. The matching configurations of print elements preferably contain matching spatial frequencies. Preferably, the matching spatial frequencies have a line frequency of at least 110 lines per inch.

As an alternative to encoding the print elements of the latent image and its visually integrated setting directly as bit maps, at least the latent image can be defined by characters of a font that is filled with the print elements arranged in a given orientation and spatial frequency. The print elements of the visually integrated setting are preferably arranged in a different orientation or a different spatial frequency than the orientation and spatial frequency of the filled characters.

The print elements of the decrypting portion of the viewer are preferably arranged to at least partially match the orientation and spatial frequency of the print elements of either the filled characters of the latent image or the visually integrated setting. The spatial frequencies of the print elements can be matched by integer multiples of one another frequencies, which provide sufficient contrast for visually distinguishing the characters from their setting. For example, for purposes of decrypting a line-screen pattern printed on the document at a frequency of 120 lines per inch, the line-screen pattern printed on the viewer could be arranged at either 60 lines per inch or 240 lines per inch. In addition, the matching line frequencies can depart from integer multiples by ten percent or more and still provide sufficient contrast for distinguishing the latent images from their visually integrated settings.

The viewer file can also contain information for printing hidden security indicia, and the document file can also contain information for printing a decrypting portion for revealing the hidden security indicia in the viewer. The information embedded in the security indicia can be divided between the document and the viewer so that neither contains complete information without the other. The decrypting portion of the viewer can formed by relatively oriented print elements arranged in a configuration that at least partially matches relatively oriented print elements forming the hidden security indicia of the document. The decrypting portion of the document can be formed by relatively oriented print elements arranged in a configuration that at least partially matches relatively oriented print elements forming the hidden security indicia of the viewer.

Another version of the invention as a document authentication system includes a processor that receives information into a layout for printing both an original document and a document viewer. The layout of the original document contains both (a) visible data elements for reproducing at least some of the information and (b) relatively invisible data elements for hiding at least some of the information within the document. The layout of the document viewer contains a decrypting portion in registration with at least some of the relatively invisible data elements within the layout of the original document. The processor outputs files for printing both the original document and the document viewer so that the printed document viewer can be combined with the printed original document for revealing at least some of the hidden information within the printed original document.

The invisible data elements can be hidden within a neighboring printed portion of the original document as print elements arranged in a predetermined pattern. The neighboring printed portion of the original document can be formed by print elements in a different predetermined pattern. The decrypting portion of the viewer can be formed by print elements arranged in a pattern matching either the pattern of print elements that form the invisible data elements or the pattern of print elements that form the neighboring printed portion.

The processor preferably outputs the files for printing both the original document and the document viewer to one or more printers having corresponding reproductive error profiles so that the matching patterns of print elements are reproduced with corresponding errors in the printed document and the printed viewer. The matching patterns of print elements can be represented in the files as bitmaps for printing both the original document and the document viewer. Preferably, the matching patterns of print elements contain matching spatial frequencies, at least as integer multiples of one another. The print elements of the invisible data elements can be arranged in a given orientation and spatial frequency for filling characters of a font for encoding the hidden information.

Another version of the invention as a document authentication system includes both a printed document and a printed document viewer. The printed document contains (a) visible data elements for reproducing information and (b) relatively invisible data elements that are hidden within a neighboring printed portion of the printed document for hiding at least some of the information within the printed document. The printed document viewer contains a decrypting portion. The invisible data elements of the printed document are formed by print elements in a predetermined pattern. The neighboring printed portion of the printed document is formed by print elements in a different predetermined pattern. The decrypting portion of the printed document viewer is formed by print elements arranged in a pattern matching either the pattern of print elements that form the invisible data elements or the pattern of print elements that form the neighboring printed portion. The printed document and the printed document viewer are printed on one or more printers having corresponding reproductive error profiles so that the matching patterns of print elements are reproduced with corresponding errors in the printed document and the printed document viewer. The printed document viewer is combinable with the printed document for revealing at least some of the hidden information within the printed document.

The invisible data elements can include characters of a font that is filled by print elements arranged at a given orientation and spatial frequency. The print elements of the neighboring printed portion of the printed document can be oriented at a different angle than the print elements that fill the font of the invisible data elements but can be printed at substantially the same visual density as the print elements that fill the font of the invisible data elements so that the invisible data elements are at least partially indistinguishable from the neighboring printed portion to the naked eye. The document viewer is preferably printed on a transmissive substrate. The printed document viewer can also be used as a master from which additional reproductions of the viewer can be made.

Another version of the invention as document authentication system includes a document file linked with a viewer file for transmission to one or more sites. The document file contains information for reproducing a document in a visible form having hidden security indicia, and the viewer file contains information for reproducing a document viewer in a visible form having a decrypting portion. The reproduced document and the reproduced viewer are alignable for revealing the hidden security indicia in the document.

The security indicia can be embedded as a latent image within a visually integrated setting of the reproduced document so as to be at least partially indistinguishable from the integrated setting to the naked eye. The latent image and the visually integrated setting of the reproduced document can be formed by relatively oriented line elements arranged in respective configurations. In addition, the decrypting portion of the viewer can be formed by relatively oriented line elements arranged in a configuration that at least partially matches one of the different configurations of (a) the line elements of the latent image and (b) the line elements of the visually integrated setting.

The viewer file can also contain information for reproducing hidden security indicia, and the document file can also contain information for reproducing a decrypting portion for revealing the hidden security indicia in the viewer. For example, the decrypting portion of the viewer can be formed by relatively oriented line elements arranged in a configuration that at least partially matches relatively oriented line elements forming the hidden security indicia of the document, and the decrypting portion of the document can be formed by relatively oriented line elements arranged in a configuration that at least partially matches relatively oriented line elements forming the hidden security indicia of the viewer.

Another version of the invention as a method of authenticating a document includes relating a document file with a viewer file for transmission to a site. The document file is reproduced in a visible form as a document containing hidden security indicia, and the viewer file is reproduced in a visible form as a viewer having a decrypting portion for revealing the hidden security indicia in the document.

The security indicia can be encoded as a latent image embedded in a visually integrated setting so as to be at least partially indistinguishable from the setting to the naked eye. Both the latent image and the visually integrated setting can be formed as oriented line elements arranged in different configurations. Preferably, the decrypting portion of the viewer is formed as relatively oriented line elements arranged in a configuration that at least partially matches one of the different configurations of (a) the line elements of the latent image and (b) the line elements of the visually integrated setting.

An image of at least one of the document and the viewer can be produced on a viewing screen. The document and the viewer can be aligned on the viewing screen for revealing the hidden indicia.

DETAILED DESCRIPTION OF THE INVENTION

Figure 1:
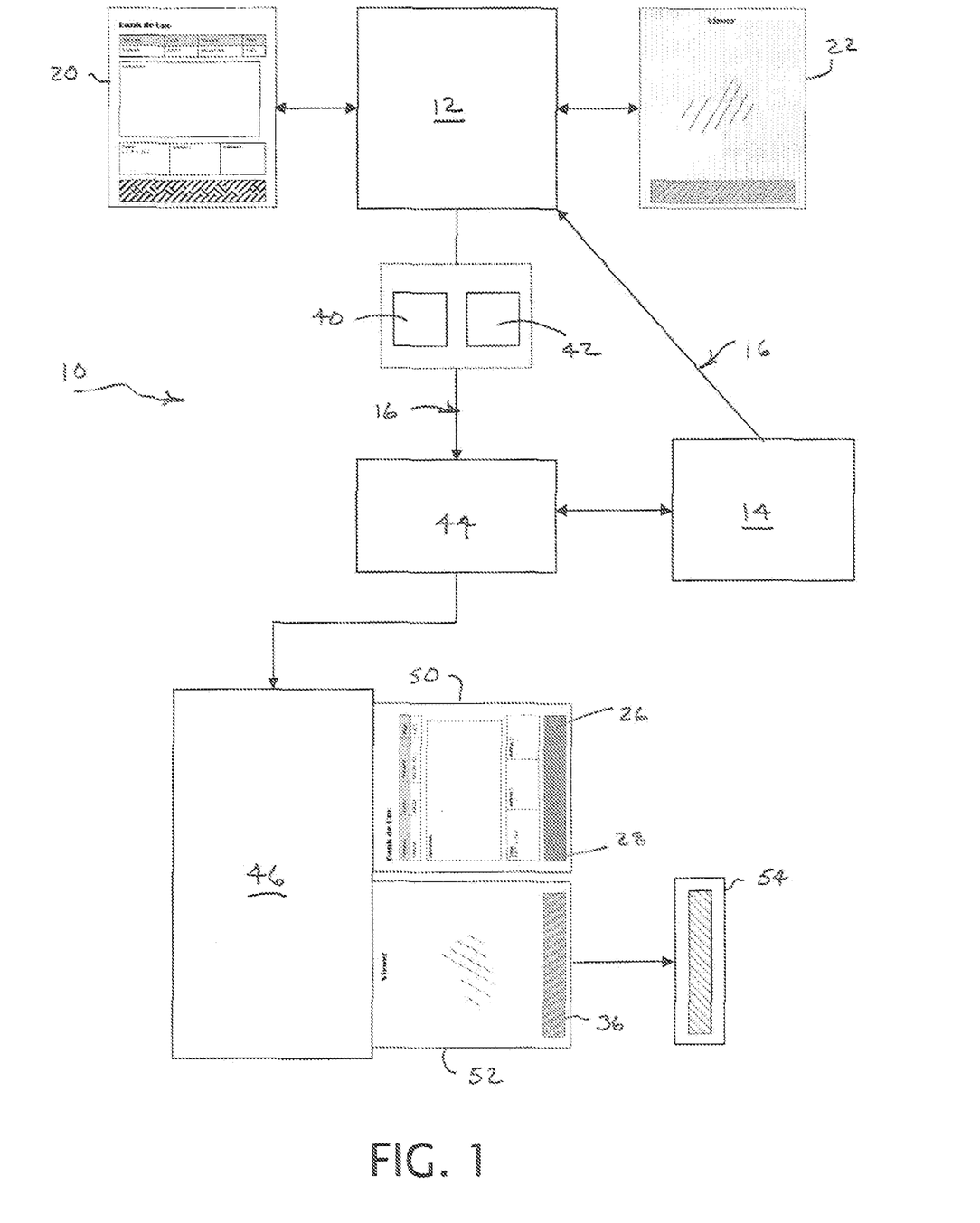
FIG. 1 is a diagram illustrating a document verification system in which a processor receives an order and outputs print files for printing both an original document and a related authentication viewer.

One example of a document authentication system 10 in accordance with the invention is depicted in FIG. 1. A server 12, which includes a computer processor, receives a document order from a system client 14. The order can be a request for a specific document, such as a document intended for a single use transaction. Information for specifying the type of document and other information for completing the document can be transmitted to the server 12 over a network 16, which can involve internet communications or other public or private network communications.

Figure 2:
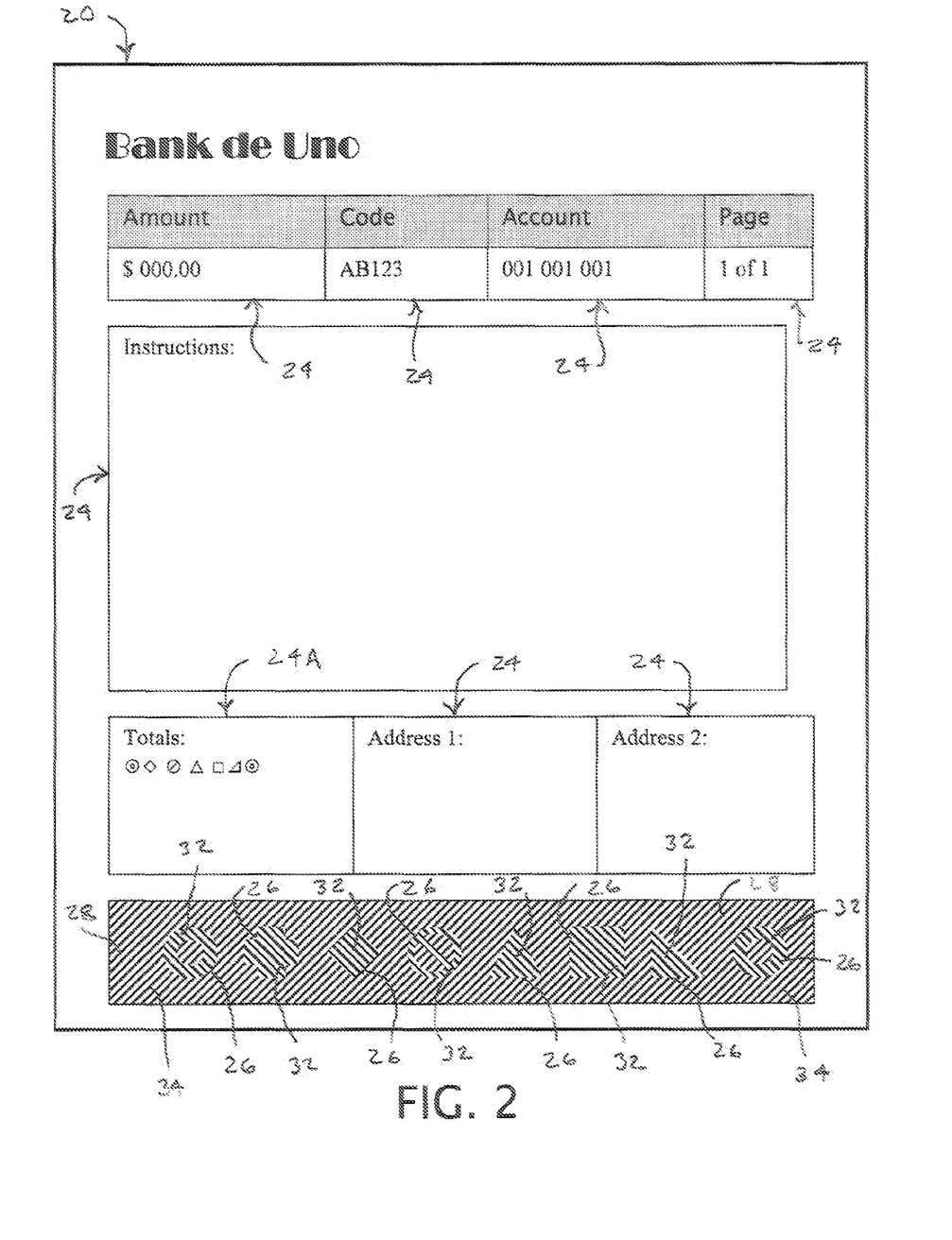
FIG. 2 is front view of the original document as a form of bank note having latent images containing hidden security indicia embedded in a visually integrated setting.

The server 10 has access to predefined templates, such as a document template 20 for the ordered document and an authentication viewer template 22 arranged for use with the document template 20. Information received by the server is used to populate fields 24 within the document template 20 as shown in FIG. 2. Some of this information or other information included in the order or stored within the document template 20 is encoded as latent images 26 within a visually integrated background 28. The encoded information, which can be generally referred to as security indicia, can include information from the visible fields 24, such as the contents of the visible field 24A.

The latent images 26 and their common visually integrated setting 28 are encoded as respective line-screen patterns 32 and 34 having similar line frequencies but different angular orientations. The line-screens 32 and 34 are made up of ordered arrays of print elements. For example, each of the line-screen patterns 32 and 34 can be formed by an array of print elements, such as dots, dashes, line segments, or other elemental shapes, in an arrangement of systematically spaced lines. The two line-screen patterns 32 and 34 are formed so as to be indistinguishable from one another to the naked eye, but can differ in some respect, such as orientation angle, that can be optically exploited for viewing the latent images 26. Preferably, the two line-screen patterns 32 and 34 are printed in the same color and at the same print density but differ in orientation, line frequency, or the shape or size of their print elements.

The line-screen patterns 32 and 34 are depicted at an exceptionally low line frequency so that the patterns 32 and 34 can be indicated in the drawings; but in practice, the line frequencies are much higher so that the individual lines of the patterns are not readily discernable to the naked eye. Line frequencies of 110 lines per inch or higher are preferred. As such, both the latent images 26 and their common visually integrated setting 28 appear together as a substantially uninterrupted tint.

Figure 3:
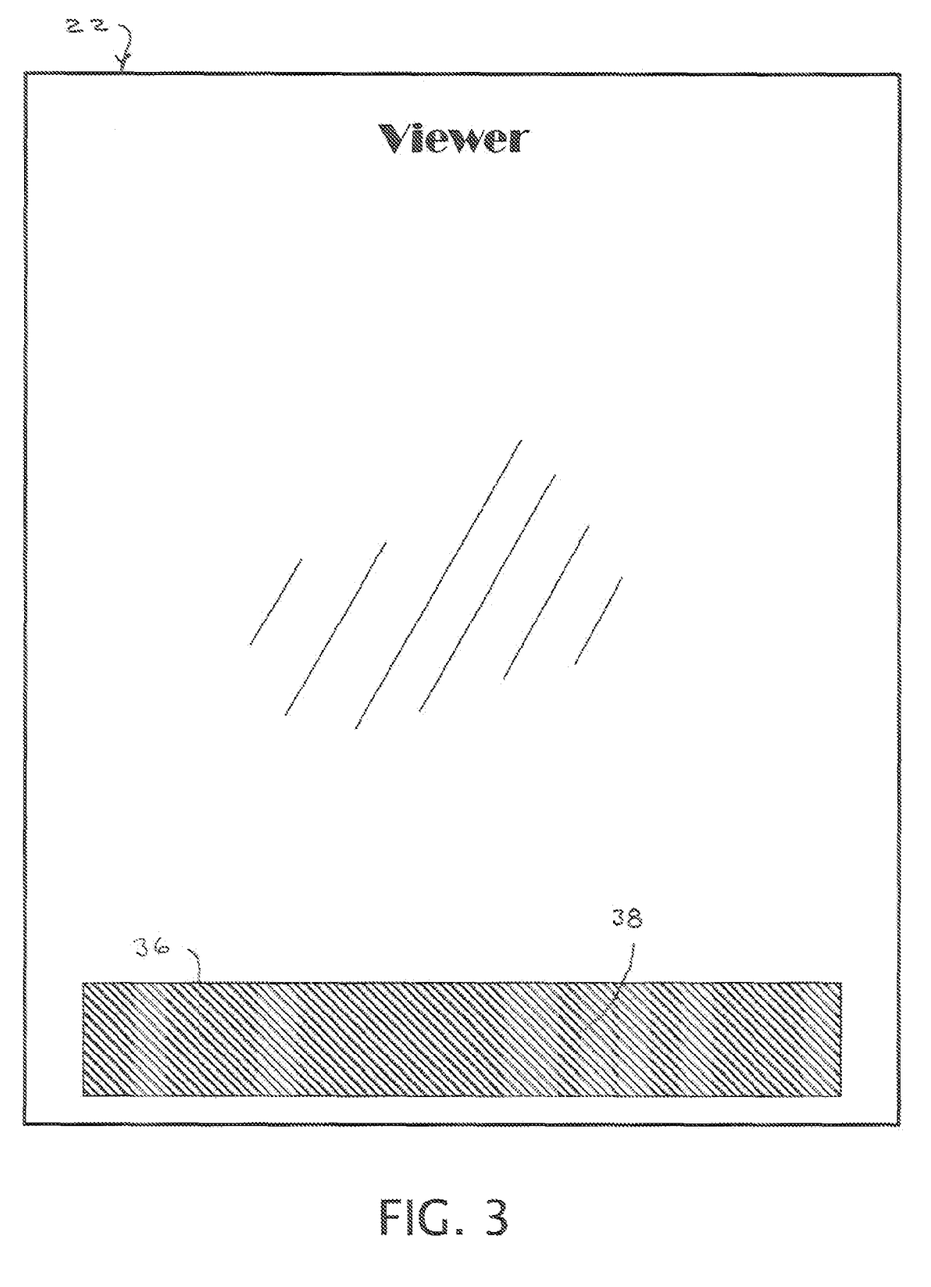
FIG. 3 is a front view of the authentication viewer including a decrypting portion for revealing the hidden security indicia of the latent images in the original document.

As shown in FIG. 3, The authentication viewer template 22 includes a decrypting portion 36 to which information is added for incorporating a line-screen pattern 38 matching one or the other of the line-screen patterns 32 or 34 of the document template 20. The illustrated line-screen pattern 38 matches the line-screen pattern 32 used to encode the latent images 26. Preferably, the line frequency of the line-screen pattern 38 equals the line frequency of the line-screen pattern 32 to which it is matched, but the two line frequencies could also be integer multiples of one another. Frequency variations between the overlapping line-screen patterns of up to 10 percent or more can often be accommodated while still providing for sufficiently distinguishing the latent security images 26 from their visually integrated setting 28.

The line-screen patterns 32, 34, and 38 incorporated into both the document template 20 and the viewer template 22 are preferably defined as raster images in the form of bit maps. The two templates 20 and 22, together with the information incorporated within them, are stored at least temporarily as files 40 and 42 for transmission over the network 16. The files 40 and 42 can accept a variety of formats including PDF (Portable document Format), TIFF (Tagged Image File Format), or other web-deliverable image files. The line screen patterns 32, 24, and 38 can be encoded directly as raster images or indirectly as fonts that are themselves constructed as similar raster images.

The two files 40 and 42, which can be bundled together for storage or transmission, are received at a print site 44, which can be in common with or in communication with the client 14. The two files 40 and 42 are delivered a printer 46 for printing both an original document 50 and a related authentication viewer 52 on a choice of substrates, which include paper, plastic, film, or laminate constructions. The original document 50 is preferably printed on paper, and the related authentication viewer is preferably printed on a transmissive film, e.g., a transparency. However, the authentication viewer 52 could be printed on paper and the original document could be printed on a transparency or both on transparencies or both on paper. In the latter case, at least one or the other of the original document 50 and the viewer 52 is preferably further processed to a transparent or at least translucent stage.

The printer 46 can be a standard desktop printer such as a laser printer. Any systematic errors in printing the original document 50 and the authentication viewer 52 are common to the two documents. The desired line-screen patterns 32, 34, and 38, which might otherwise exceed the reproductive capability of the printer, are similarly reproduced between the documents. That is, although line-screens may be printed in a slightly altered form, the altered line-screen patterns still match each other as required between the original document 50 and its related viewer 52.

Both files 40 and 42 are shown in FIG. 1 bundled and delivered together to the same site 44 and received by the same printer 46. However, the two related files could be delivered to different sites or different printers or at different times to different recipients with different security levels. The different printers are preferably related, such as sharing the same make and model, so that the printers share corresponding reproductive error files. As such, the altered line-screen patterns still match each other as required between the original document 50 and its related viewer 52.

Figure 4:
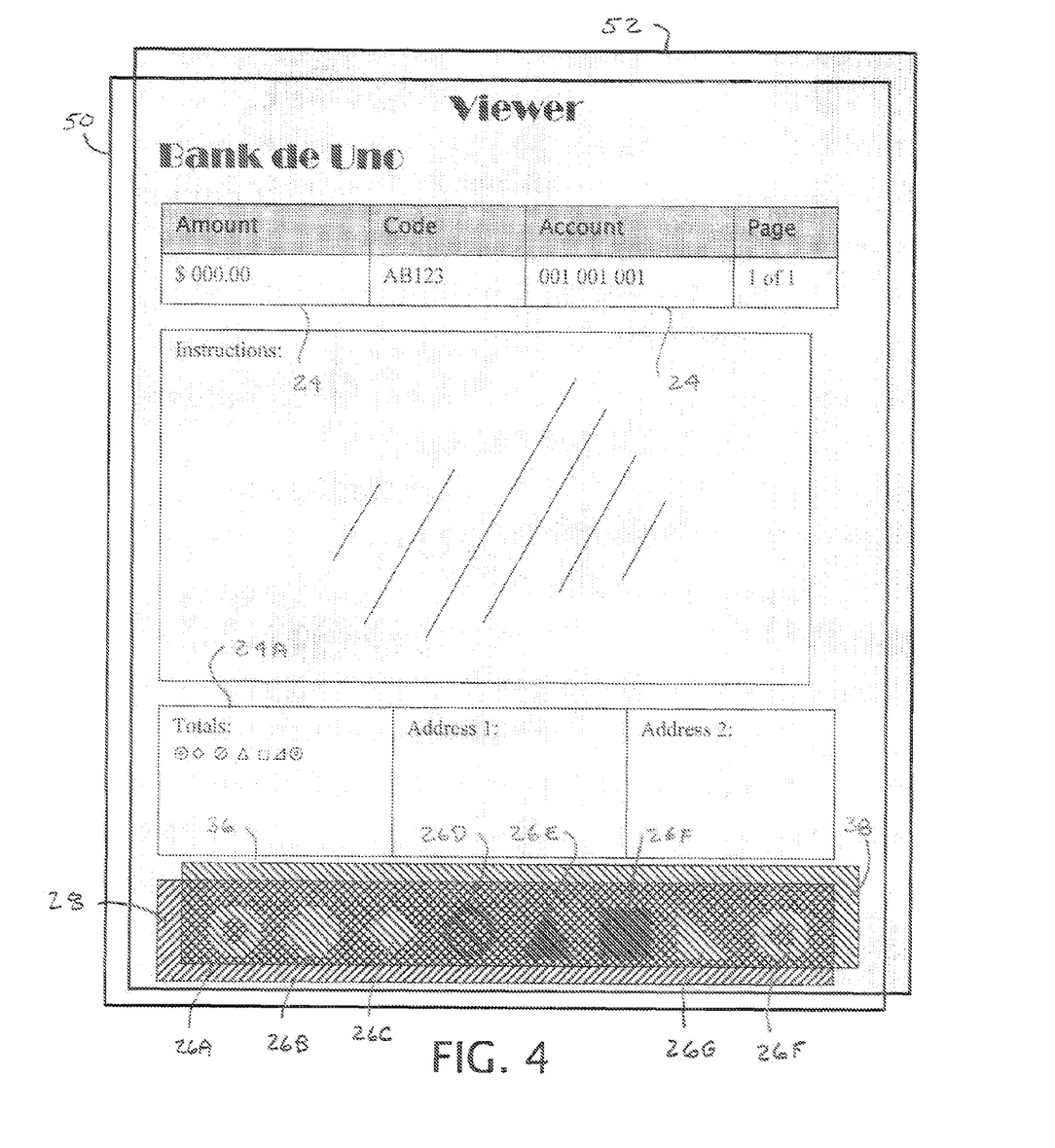
FIG. 4 is a similar view showing the authentication viewer overlying the original document and revealing the hidden security indicia as being lighter or darker in contrast with the visually integrated setting.

FIG. 4 shows the printed viewer 52 overlying the original document 50 with the decrypting portion 36 of the viewer 52 aligned with the latent images 26 of the original document 50. In particular, the line-screen pattern 38 of the decrypting portion 36 is aligned with the line-screen pattern 32 of the latent images 26. The resulting visual effect is to increase the contrast between the latent images 26 and their visually integrated setting 28. The latent images 26A, 26B, 26C, 26G, and 26H are rendered lighter than their common setting 28, and the latent images 26D, 26E, and 26F are rendered darker than their common setting 28. When the line-screen patterns 32 and 38 overlap line to line, the latent images 26A, 26B, 26C, 26G, and 26H are rendered relatively lighter; and when the line-screen patterns 32 and 38 overlap line to space, the latent images 26D, 26E, and 26F are rendered relatively darker.

Although all of the latent images 26A-F are encoded by the same line-screen pattern, two or more different line screen patterns can be used to encode different sets of latent images. For example, different data relevant to the contents of the original document can be encoded with different line screens. To read the differently encoded information, the viewer 52 could be modified to include different decoding portions with different line-screen patterns corresponding to the different line-screen patterns of the latent images or could be modified to include a line-screen pattern matching the line screen pattern 34 of the common visually integrated setting to read all of the latent images. The line-screen patterns of the visually integrated settings for the different sets of latent images could also be differentially modified, so that two viewers or two different decrypting portions of the same viewer are required to view all of the information encoded by the latent images. Access to the information encoded by the latent images could be controlled by using multiple line screen patterns and by controlling the corresponding decoding power of viewer.

A user can be authorized to download the viewer file 42 separately or in combination with its related document file 40 and to print the viewer file 42 on the pre-targeted (fingerprinted) printer, such as the printer 46. The printed viewer 52 enables the user to view secure information in the original document 50 also downloaded from the server 12. After use revealing information hidden in the document 50, the viewer 52 as a printed document can be easily destroyed.

Instead of printing the viewer 52 directly, such as printing the viewer file 42 on a transparency ready for immediate use, the viewer 52 could be printed on paper, film or other medium as a master for making one or more viewers, such as the viewer 54. For example, the printed viewer 52 can be used to create a glass "magnifying" lens that would fit into a "loupe" for discreet viewing of "coded" information.

Alternatively, the printed viewer 52 could be scanned at a high resolution, such as between 2540 dots per inch (DPI) and 4000 dots per inch (DPI). For purposes of scanning, the print density of the decrypting portion 36 is preferably in a range of between 40 percent and 50 percent in a dark color, such as black. Within an image-editing program, such as Photoshop from Adobe Systems of San Jose, Calif., the scanned file can be opened and cleaned to restore the desired line patterns. Adjustments can also be made if, for example, the file needed to become brighter. The modified file is then saved and output to a printer or other reproducing machine for incorporating the encoded pattern onto a substrate, such as a plastic plate or transparency. For example, a die plate can be made and embossed into plastic, or the desired pattern can be laser etched of imaged into plastic or glass lenses, including glass magnifiers. The remanufactured viewer, such as the viewer 54, reader can now be placed over an original document 50 for decoding the latent images.

Either the original viewer 52 or the remanufactured viewer 54, also preferably printed on a transparency, can be sent to a plate maker (not shown). The plate maker uses the transparency output (a) as the image to be burned on a plate or imaged on silkscreen films or plates, (b) as a master for embossing plastic, or (c) as a file for a laser to burn images into a plastic, acrylic, or glass viewing lens. At the same time, the other colors or images (visible artwork) could be embossed, laser etched or imaged, burned, or otherwise incorporated into the viewer lens.

The image files 40 and 42 could also be sent to the desktop printer or other printer loaded with transparency/laminate stock. The printer outputs images onto transparency/laminate stock. The lamination stock is then put onto plastic ID cards. The line structure in the lamination reacts with the line structures on the ID card to reveal hidden information.

In the examples given, both images files 40 and 42 are printed onto substrates in the form of an original document 50 and a matching viewer 52. The substrate of one or both of the printed document 50 and viewer 52 is preferably transmissive so the line-screen patterns on the two substrates can be overlaid for producing a combined image that reveals the latent images 26 encoded in the original document 50.

As an alternative to printing, one or the other or both of the image files 40 and 42 can be viewed on a monitor. For example, only the viewer 52 could be printed, and the printed viewer 52 could be overlaid against a monitor displaying an image of the document 50 to reveal the latent images 26 embedded in the document. Alternatively, both the document 50 and the viewer 52 could be viewed on a monitor or other screen in a manner that allows the two images to be superimposed. For example, an image of the viewer 52 could be dragged across a computer screen into a position of alignment with an image of the document 50.

While the latent images 26 have been considered as security indicia for valuable documents, the latent images 26 can also encode other types of security indicia in the form of graphics or information where merely selective viewing is desired. For example, the original documents could be in the form of game pieces or game boards, whose contents are hidden in the form of latent images that can be subsequently revealed by a viewer having a corresponding or complementary pattern.

In the examples given above, the original document 50 and the viewer 52 perform distinct functions. The original document 50 contains hidden text or graphics in the form of latent images 26 within visually integrated settings 28 and the viewer contains a decrypting portion 36 that imbalances contrast between the latent images 26 and their visually integrated settings 28. However, text and graphics could be hidden in both the original document and the viewer, and both the original document and the viewer could contain decrypting portions such that the decrypting portion of the document reveals the latent images in the viewer and the decrypting portion of the viewer reveals the latent images in the document. For example, the visually integrated settings in both the document and the viewer could be used as the decrypting portions. Individual latent images including characters or symbols could be divided between the two document/viewers to provide enhanced security.

Additional objects, advantages, and novel features of the present invention will become apparent to one ordinarily skilled in the art upon examination of the foregoing examples, which are not intended to be limiting. It will be appreciated that certain features of the invention, which are, for clarity, described in the context of separate embodiments, can also be provided in combination in a single embodiment. Conversely, various features of the invention, which are, for brevity, described in the context of a single embodiment, may also be provided separately or in any suitable sub-combination.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference.

The invention claimed is:

1. A document authentication system comprising
   a server having access to a plurality of predefined templates corresponding to particular types of documents and authentication viewers arranged for use with the documents,
   the server being arranged for receiving orders for documents, each specifying both the type of document and information for populating fields within the document,
   a document of the specified document type being populated with the information from one of the orders and being stored as a document file along with an associated viewer file,
   the document file being linked with the viewer file for transmission to a different site for reproducing the transmitted document and viewer files in fulfillment of the one order,
   at least one of the populated fields of the document being embedded in the document as a latent image at least partially surrounded by a visually integrated setting of the document so as to be at least partially indistinguishable in the reproduced document from the integrated setting to the naked eye,
   the latent image being formed by a first line screen pattern having a first orientation,
   the visually integrated setting being form by a second line screen pattern having a second orientation that is different from the first orientation, and
   the document viewer incorporating a line screen pattern that complements the line screen pattern of one or the other of the latent image and the visually integrated setting to create sufficient contrast to render the latent image visible in the reproduced document.

2. The system of claim 1 in which the decrypting portion of the viewer is formed by arranging the viewer line screen pattern in a configuration that at least partially matches one of the different configurations of (a) the latent image line screen pattern and (b) the visually integrated setting line screen pattern.

3. The system of claim 2 in which the document file and the viewer file are arranged with respect to two or more standard desktop printers having matching reproductive error profiles so that the at least partially matching configurations of line screen patterns are reproduced with corresponding errors in the printed document and the printed viewer.

4. The system of claim 3 in which the document file and the viewer file represent the at least partially matching configurations of line screen patterns as bitmaps.

5. The system of claim 2 in which the matching configurations of line screen patterns contain matching spatial frequencies.

6. The system of claim 5 in which the matching spatial frequencies have a line frequency of at least 110 lines per inch.

7. The system of claim 2 in which the latent image includes characters having a font that is filled with the line screen pattern arranged in a given orientation and spatial frequency.

8. The system of claim 7 in which the line screen pattern of the visually integrated setting is arranged in at least one of (a) a different orientation and (b) a different spatial frequency than the orientation and spatial frequency of the filled characters.

9. The system of claim 8 in which the line screen pattern of the decrypting portion is arranged to at least partially match the orientation and spatial frequency of the line screen pattern of one of (a) the filled characters and (b) the visually integrated setting.

10. The system of claim 1 in which the viewer file also contains information for printing hidden security indicia, and the document file also contains information for printing a decrypting portion for revealing the hidden security indicia in the viewer.

11. The system of claim 10 in which the decrypting portion of the viewer is formed by a relatively oriented line screen arranged in a configuration that at least partially matches relatively oriented line screen forming the hidden security indicia of the document, and the decrypting portion of the document is formed by a relatively oriented line screen arranged in a configuration that at least partially matches relatively oriented print elements forming the hidden security indicia of the viewer.

12. A document authentication system comprising
a server having access to a plurality of predefined templates corresponding to particular types of documents and authentication viewers arranged for use with the documents,
the server being arranged for receiving orders for documents, each specifying both the type of document having prearranged fields and information for populating the prearranged fields within the document,
the prearranged fields within a document of the specified document type being populated with the information from one of the orders and the populated document being stored as a document file along with an associated viewer file,
the document file containing the populated document and the viewer file containing the associated viewer being linked for transmission to a different site for printing the transmitted document and viewer files as an original document and a document viewer,
the prearranged fields of the original document containing (a) visible data for reproducing at least some of the information within a first area of the document and (b) relatively invisible data for hiding at least some of the same information within a second area of the document,
the document viewer containing a decrypting portion;
the relatively invisible data being formed by a line screen pattern within the second area of the document and being rendered substantially invisible by a neighboring printed portion within a third area of the document being formed by a different line screen pattern,
the decrypting portion of the document viewer incorporating a line screen pattern that complements the line screen pattern of one or the other of the relatively invisible data and the neighboring printed portion to create sufficient contrast with the line screen pattern of the neighboring printed portion to render the relatively invisible data visible.

13. The system of claim 12 in which the server outputs the files for printing both the original document and the document viewer to two or more standard desktop printers having corresponding reproductive error profiles so that the complementary line screen patterns are reproduced with corresponding errors in the printed document and the printed viewer.

14. The system of claim 12 in which the complementary line screen patterns are represented in the files for printing both the original document and the document viewer as bitmaps.

15. The system of claim 14 in which the complementary line screen patterns contain matching spatial frequencies.

16. The system of claim 12 in which the line screen pattern of the relatively invisible data is arranged in a given orientation and spatial frequency for filling characters of a font for encoding the relatively invisible data.

17. A method of authenticating a document comprising steps of
providing access to a plurality of predefined templates corresponding to particular types of documents and authentication viewers arranged for use with the documents,
receiving orders for documents, each specifying both the type of document and information for populating fields within the document,
populating a document of the specified document type with the information received from one of the orders,
storing the populated document as a document file along with an associated viewer file,
linking the document file with the viewer file for transmission to a different site for printing the transmitted document and viewer files,
embedding at least one of the populated fields within the document as a latent image at least partially surrounded by a visually integrated setting of the document so as to be at least partially indistinguishable from the visually integrated setting to the naked eye,
forming the latent image and the visually integrated setting of the document by differently oriented line screen patterns in different areas of the printed document, and
incorporating a line screen pattern within the document viewer that complements the line screen pattern of one or the other of the latent image and the visually integrated setting to create sufficient contrast to render the latent image visible in the document.

18. The method of claim 17 in which the step of forming includes defining the differently oriented line screen patterns as bitmaps.

19. The method of claim 17 in which the step of forming includes defining the differently oriented line screen pattern of the latent image as characters of a font.

20. The method of claim 17 including a step of printing the document file and the viewer file on two or more standard desktop printers having matching reproductive error profiles so that the complementary line screen patterns are reproduced with corresponding errors in the printed document and the printed viewer.

* * * * *